July 27, 1965   E. K. HANSEN   3,197,075
VARIABLE VOLUME AUGER ASSEMBLY
Filed Nov. 16, 1962   4 Sheets-Sheet 1

INVENTOR
ELMER K. HANSEN
BY
ATTORNEYS

July 27, 1965 E. K. HANSEN 3,197,075
VARIABLE VOLUME AUGER ASSEMBLY
Filed Nov. 16, 1962 4 Sheets-Sheet 2

INVENTOR
ELMER K. HANSEN
BY
ATTORNEYS

July 27, 1965  E. K. HANSEN  3,197,075
VARIABLE VOLUME AUGER ASSEMBLY
Filed Nov. 16, 1962  4 Sheets-Sheet 3

INVENTOR
ELMER K. HANSEN
BY
ATTORNEYS

July 27, 1965

E. K. HANSEN 3,197,075

VARIABLE VOLUME AUGER ASSEMBLY

Filed Nov. 16, 1962

INVENTOR
ELMER K. HANSEN
BY
*Rudolph L. Lowell*
ATTORNEYS

United States Patent Office 3,197,075
Patented July 27, 1965

3,197,075
VARIABLE VOLUME AUGER ASSEMBLY
Elmer K. Hansen, 126 Cecelia, Sioux City, Iowa
Filed Nov. 16, 1962, Ser. No. 238,135
10 Claims. (Cl. 222—134)

This invention relates to bulk material handling apparatus and more particularly to a bulk material carrying vehicle which has a material blending auger unit including a variable volume auger means for varying the ratio between materials to be blended or mixed.

It is the object of the present invention to provide an improved bulk material handling vehicle wherein a power driven bulk material blending and unloading auger means is adjustable to vary the blend ratios of bulk materials separately supplied to the auger means.

Another object of the invention is to provide a bulk material blending and unloading vehicle which is continuous in operation to quickly blend a plurality of bulk materials separately supplied to the vehicle and to completely unload the blended material from the vehicle.

A further object of the invention is to provide an auger assembly comprised of a minimum number of parts and readily adjustable to vary the volume of the spaces between adjacent flights when the auger is either in operation or at rest.

A still further object of the invention is to provide a bulk material handling vehicle with an auger assembly which is manually adjustable to vary the volumetric space between adjacent auger flights or flanges to control the blending ratios between a plurality of bulk materials supplied to the assembly.

An additional object of the invention is to provide a bulk material handling vehicle with forward and aft material bins and wherein an unloading auger assembly is adjustable to vary the amount of material conveyed from the forward bin to the aft bin and to remove the material from the aft bin independently of the material in the forward bin.

Another object of the invention is to provide an improved, bulk material handling vehicle which is simple and rugged in construction, economical in cost, and versatile, reliable and efficient in use.

According to the invention, a bulk material handling vehicle is provided with a box formed with a pair of longitudinally spaced end walls and a transverse wall to divide the box into forward and aft bulk material holding bins. These walls have axially aligned openings formed in their bottom portions adjacent the bottom of the box. A power driven elongated auger assembly extended through the openings in the walls is rotated by a power take-off drive from a tractor to move bulk materials out of the bins into a housing containing an upright discharge auger which is drivably connected to the aft end of the auger assembly.

The auger assembly, within the forward bin of the vehicle box, includes means for varying the rate at which material from the forward bin is moved into the aft bin for mixing with the material in the aft bin. The mixed or blended material is fed by the auger assembly into the upright discharge auger for direct loading into a storage bin or feed trough.

The exact nature of the invention as well as other objects and advantages thereof will be readily apparent from a consideration of the following specification relating to the annexed drawing in which:

FIGURE 5 is an enlarged perspective view of the feed adjusting mechanism of FIGURE 1 looking in the direction of the arrow A.

Throughout the several views of the drawing the same reference numbers identify corresponding structure.

Figure 1:
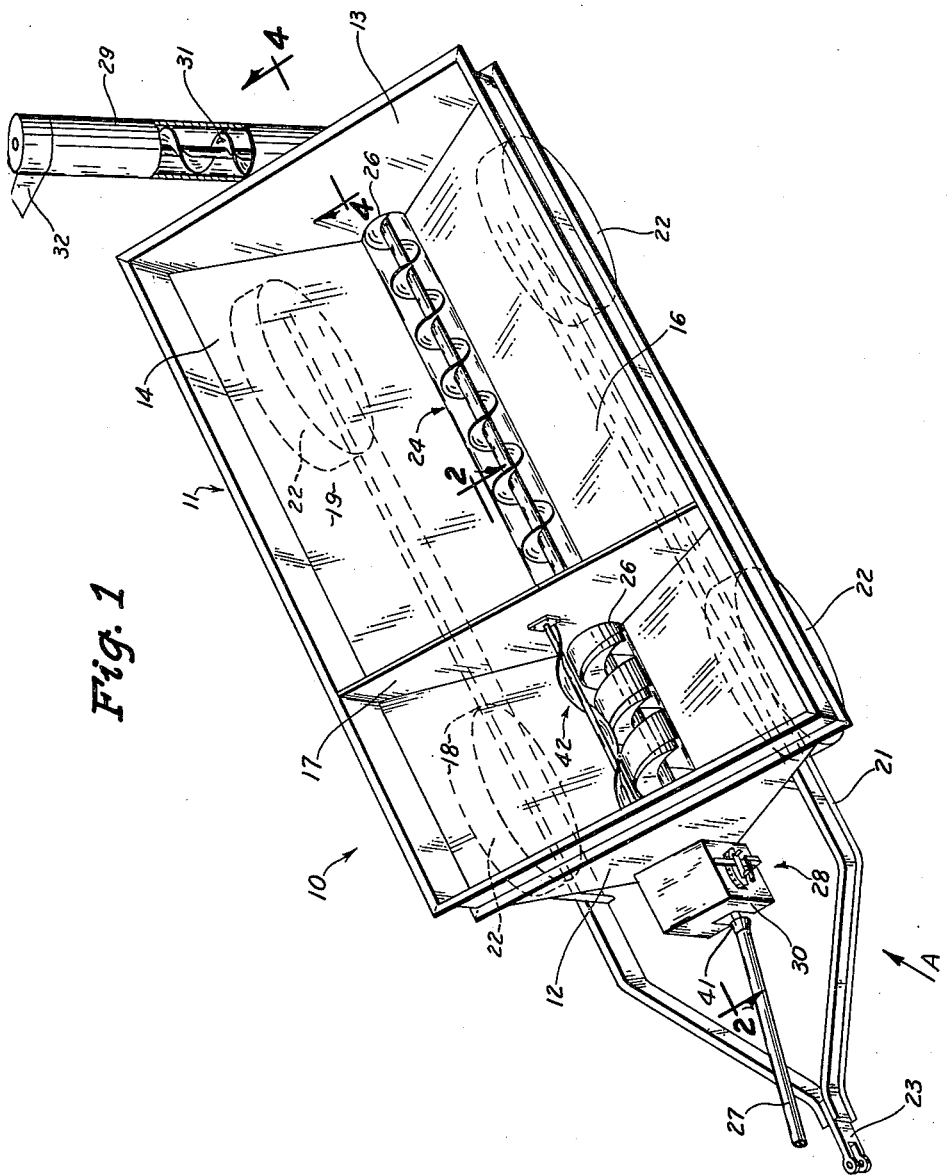
FIGURE 1 is a perspective view of the material handling mechanism of the present invention.

With reference to the drawing the bulk material blending and unloading vehicle of this invention, indicated generally at 10 is illustrated in FIGURE 1 as a material handling wagon having a bulk material body or box 11 of a flare type. The body 11 has longitudinally spaced and parallel front and rear end walls 12 and 13 which are secured to downwardly converging side walls 14 and 16. A dividing wall or partition 17 is transversely extended between the side walls 14 and 16 and divides the body into a forward bin 18 and an aft bin 19. The forward bin 18 is smaller than the aft bin 19. However, the relative sizes of the bins may be varied by changing the longitudinal position of the dividing wall 17. The body 11 is supported on a portable frame 21 having ground wheels 22 and a tongue 23 adapted to be secured to a power driven vehicle such as a tractor.

The bulk material in the bins 18 and 19 is removed from the body 11 by an auger assembly 24 which is rotatably mounted in the lower or apex portion of the body and projects through axially aligned openings 26 in the walls 12, 13 and 17 of the body. The auger assembly 24 is connected to a tractor or other power driven vehicle by a power take-off drive shaft 27 having suitable universal joints 41. An auger control linkage 28 is connected to a box-shaped shield 30 mounted on the front side of the forward end wall 12 and is operable to adjust the displacement capacity of that portion of the auger assembly extended through the forward bin 18.

The bulk material mixed and moved by the auger assembly 24 is fed into an upwardly extended conveyor member 29 having an axially disposed discharge auger 31 drivably connected to the auger assembly 24 and a spout 32. The conveyor member 29 is pivotally mounted on the rear end wall 13 and is movable to control the deposited position of the mixed bulk material. The details of the tubular conveyor member 29 form the subject matter disclosed in applicant's U.S. Patent No. 2,839,208, issued June 17, 1958.

Figure 2:
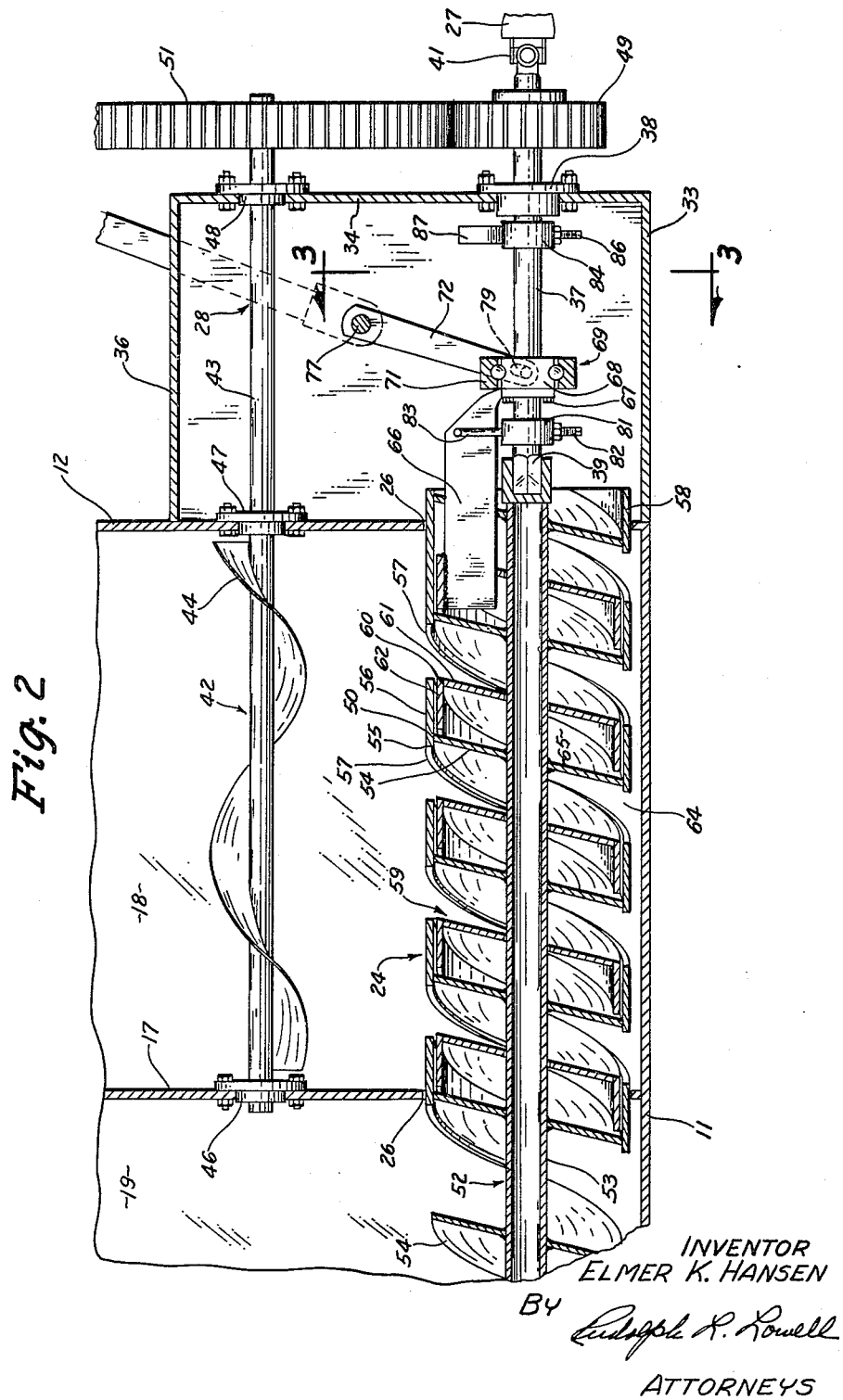
FIGURE 2 is an enlarged sectional detail view taken along the line 2—2 of FIGURE 1 showing the variable volume auger assembly and drive therefor.
Figure 3:
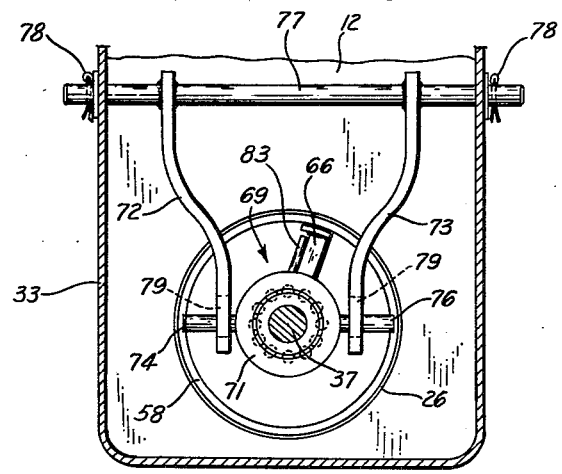
FIGURE 3 is a sectional view taken along the line 3—3 of FIGURE 2.

As shown in FIGURES 2 and 3, a U-shaped housing 33 is secured by means of a weld to the apex portion of the front wall 12 around the auger assembly opening 26 therein. The housing 33 includes a forward end wall 34 and a top brace 36 connecting the end wall 34 with the front end wall 12.

The auger assembly 24 is drivably connected with the power take-off drive shaft 27 by a shaft 37 rotatably mounted in axial alignment with the auger assembly 24 by means of a bearing 38 secured to the housing end wall 34. The shaft 37 is connected to the auger assembly 24 by a male and female drive coupling 39 and is connected to the power take-off drive shaft by means of a universal joint 41.

A feeding and agitator auger means 42 comprising a drive shaft 43 and a spiral flange 44 is positioned vertically above and in longitudinal alignment with the auger assembly 24. The shaft 43 extends through the front end wall 12 and is mounted by means of bearings 46, 47 and 48 to the dividing wall 17, front wall 12 and housing end wall 34.

The feeding and agitating auger 42 is rotated at a slower rate in the opposite sense of rotation of the auger assembly 24 by means of a drive spur gear 49 secured to the shaft 37 and a driven spur gear 51 in driving engagement with the drive gear 49 and secured to the shaft 43. The drive ratio is approximately one to four and the pitch of the spiral flange 44 is greater than the pitch of the auger assembly 24. In operation the feeding and agitating auger being rotated in the opposite direction of rotation of the auger assembly 24 moves the bulk material in the forward bin 18 toward the front end wall 12 to ensure an even and constant flow of material to the auger assembly 24.

As illustrated in FIGURE 2 the auger assembly 24 comprises a first or blending auger 52 having a tubular drive shaft 53 and a continuous spiral flange or flight 54 which is secured to the tubular shaft at a substantially equal angle. The auger 52 is positioned in the openings 26 in the apex portions of the walls 12, 13 and 17 of the body 11 and extends across both bins 18 and 19. The section of the first auger 52 which is positioned in the forward bin 18 has a continuous flat spiral ribbon 56 secured to the outer peripheral edge of the spiral flange and projects in a forward direction substantially parallel to the drive shaft 53. The pitch of the ribbon 56 is substantially equal to the pitch of the spiral flight 54. The connection between the peripheral edge 50 of the spiral flange 54 and the spiral ribbon 56 is not flush with the rear edge 55 of the spiral ribbon but forms an axially and rearwardly projecting spiral ridge 57 the purpose of which will be hereinafter described in detail. The forward end 58 of the ribbon 56 has a cylindrical shape and extends through the opening 26 in the apex portion of the front wall 12 and provides a continuous surface adjacent the surface forming the opening 26 thereby inhibiting the seepage of bulk material from the forward bin 18 into the housing 33.

A second or metering auger 59 is positioned in the forward bin 18 concentric with the first auger 52. The metering auger 59 has a continuous spiral flange or flight 61 which has a pitch substantially equal to the pitch of the spiral flange 54 of the first auger 52. A continuous flat spiral ribbon 62 is secured to the outer peripheral edge 60 of the continuous spiral flange 61 and projects axially of the shaft 53 in a rearward direction which is opposite to the direction of the projection of the continuous spiral ribbon 56. The diameter of the metering auger 59 is smaller than the diameter of the first auger 52 thereby permitting the flat ribbon 62 to telescope with the ribbon 56 of the first auger 52. The metering auger 59 has an open center which is in close proximity to the outer surface of the shaft 53 and thereby inhibits the seepage of the bulk material into the space 65 between the flanges 54 and 61 under the ribbons 56 and 62.

The axial width of the open space 64 between the flanges 54 and 61 determines the displacement capacity of the section of the auger assembly 24 in the forward bin 18. The axial length of the ribbons 56 and 62 is substantially equal and slightly greater than one-half the axial distance between the consecutive flanges. When the ribbons 56 and 62 are in an extended position, the ribbon 62 nests under the ridge 57 thereby closing the open space 64 betwen the auger flanges 54 and 61. The metering auger 59 is axially adjusted relative to the first auger 52 by means of a control bar 66 secured by means of a weld to the forward end of the metering auger. The control bar 66 projects forwardly out of the first auger and is releasably secured by means of bolts 67 to the inner race 68 of a bearing 69.

As shown in FIGURES 2 and 3, the outer race 71 of the bearing 69 is pivotally connected to a pair of arms 72 and 73 by means of horizontal pins 74 and 76 secured to the opposite sides of the bearing 69. The arms 72 and 73 are secured by welds to a control rod 77 which extends through the housing 33 and is rotatable by the control linkage mechanism 28 shown in FIGURE 1. The control shaft 77 extends through aligned holes in a vertical part of the housing 33 and is longitudinally positioned by means of cotter pins 78. The lower ends of the arms 72 and 73 contains slots 79 through which the pins 74 and 76 extend. Arm 72 is thus permitted to rotate with the control 77 whereby the bearing 69 is moved axially of the shaft 37 to adjust the axial width of the open space 64.

As shown in FIGURE 2 a collar 81 surrounds the shaft 37 adjacent the coupling 39 and is secured thereto by means of a set screw 82. A radially directed drive pin 83 is threadably connected to the collar 81. The pin 83 engages the side of the control bar 66 and functions to drive the first auger 52 and the metering auger 59 as a unit. The pin 83 permits the control bar to be moved axially of the shaft 53 but prohibits relative rotational movement between the first auger 52 and the metering auger 59.

A second collar 84 is slidably positioned on the shaft 37 adjacent the bearing 38 and is secured thereto by means of a set screw 86. A radially extending arm 87 is threadably secured to the collar 84. The arm 87 functions as an impeller blade to agitate the bulk material that seeps into the housing 33 thereby permitting axial movement of the bearing 69 relative to the shaft 37.

Figure 4:
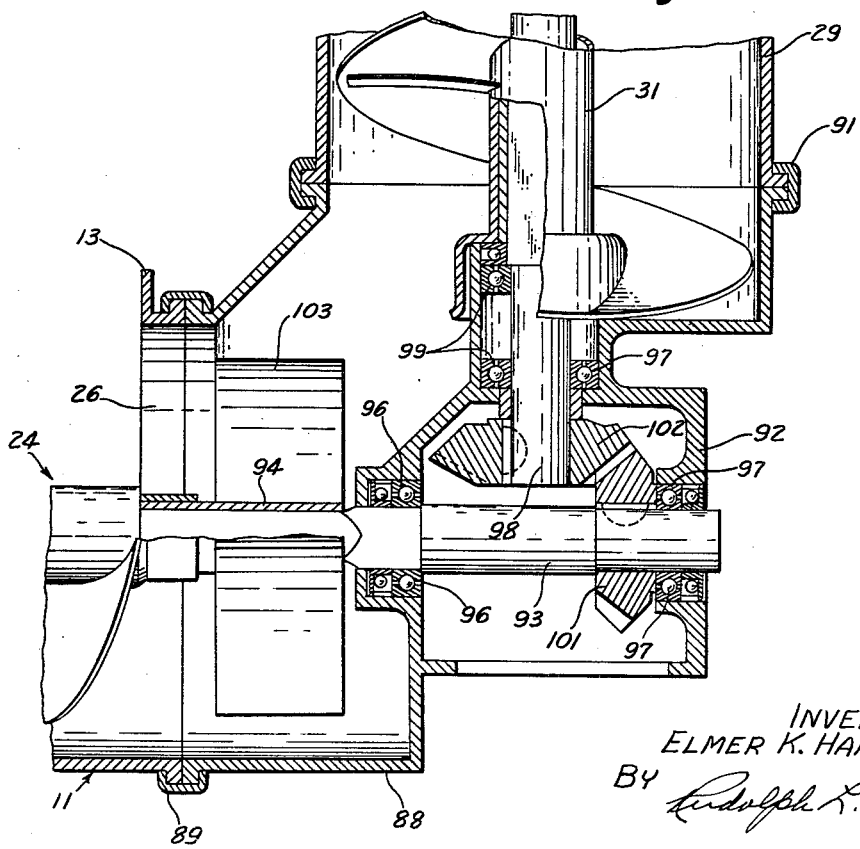
FIGURE 4 is a fragmentary elevation view in section taken along the line 4—4 of FIGURE 1 showing the drive connection between the auger assembly and the discharge auger means.

As shown in FIGURE 4, the tubular conveyor member 29 containing the discharge auger 31 is mounted on the rear end wall 13 of the body 11 adjacent the discharge opening 26 by means of a housing 88. The housing 88 is rotatably mounted on the end wall 13 by means of a split connector ring 89 and is rotatably connected to the tubular conveyor member 29 by means of a split connector 91. A gear casing 92 is formed integral with the housing 88. A shaft 93 drivably connected to the end of the auger assembly 24 by means of a male and female coupling 94 extends through the gear casing 92 and is supported thereon by means of bearings 96 and 97. The drive shaft 98 for the discharge auger 31 extends into the casing 92 and is supported thereon by bearings 99. A pair of bevel gears 101 and 102 are in driving engagement and are connected to the respective shafts within the casing 92 thereby effecting a driving connection between the auger assembly 24 and the discharge auger 31. In order to insure the proper feeding of the discharged bulk material from the opening 26 to the discharge auger 31 an impeller 103 is drivably connected to the shaft 93 adjacent the coupling 94.

From the above description it is seen that the material unloading wagon 10 of this invention has a variable volume auger 24 which is adjustable to alter the blend ratio between the bulk material in the forward bin 18 and the bulk material in the aft bin 19. The blended or mixed materials are carried from the wagon by a tubular conveyor 29 having a discharge auger 31. As best shown in FIGURE 2 the axial dimension of the open space 64 between the continuous flange 54 of the blending auger 52 and the continuous flange 61 of the metering auger 59 controls the blending ratios between the material in the forward and aft bins. An increase in the axial dimension of the space 64 increases the amount of material fed into the aft bin 19 and blends it with the material therein. When the open space 64 has been closed by the forward movement of the metering auger 59 the bulk material in the aft bin 19 may be removed from the wagon and the material in the forward bin 18 retained therein. In other words, the separate materials in the respective bins may be separately removed from the wagon.

The axial position of the metering auger 59 relative to the blending auger 52 is controlled by a manually adjustable linkage 28. As shown in FIGURE 5 the metering auger linkage 28 is fundamentally a reciprocating and rotating linkage. The linkage 28 is operatively secured to the outward extension of the control shaft 77 and includes a control lever 104 rotatably mounted on the shaft 77 by means of a bore 106 at the lower end thereof. The bore 106 is slightly larger than the diameter of the shaft 77 to permit slight lateral movement of the lever 104 on the shaft. The lever 104 extends upwardly and away from the front end wall 12 of the body 11. In order to transmit the reciprocal arcuate movement of the lever 104 into rotational movement of the shaft 77 the linkage is provided with a first channel-shaped member 107 rotatably mounted at its lower end to the shaft 77. A second channel-shaped member 108 having a pair of downwardly extending legs 109 and 111 containing axially aligned bores 112 in the legs is rotatably mounted by means of the bores on the shaft 77. The width of the U-shaped member 108 is smaller than the width of the U-shaped member 107 and the flanges of the channel-shaped members face toward each other and are in telescopic relationship thereby forming a rectangular shaped box around the lower end section of the lever 104.

The channel member 108 has an integral outwardly extending arm 113 projecting from the top portion of the web. The arm 113 has an upwardly directed finger 114 containing a bore 116. A tension spring 117 is connected to the finger 114 and the top portion of the channel member 107 thereby urging the channel members 107 and 108 together by pivoting them in opposite directions about the shaft 77.

An upwardly directed plate 118 is positioned between the channel members 107 and 108 and it has a U-shaped lower portion which is clamped on the shaft 77. The lower portion of the plate 118 has axially aligned bores adapted to receive the shaft 77. The bores 119 have a diameter slightly smaller than the diameter of the shaft 77 so as to increase the clamping action between the plate 118 and the shaft 77. The arch of the U-shaped lower section of the plate 118 is provided with an arcuate slot 121 which extends from each of the bores 119. The diametric dimension of the bores 119 may be increased by spreading the respective legs of the slotted end section thereby permitting the plate 118 to be inserted on the rod 77. A bolt 122 extends between the legs of the slotted portion of the plate 118 and is tightened to securely clamp the plate 118 to the shaft 77.

When the lever 104 is rotated in a counterclockwise direction the leading edge thereof will engage the channel member 108 thereby forcing it to move in a counterclockwise direction. The tension spring 117 resiliently urges the channel member 107 in a counterclockwise direction to rotate the plate 118 and the shaft 77. In the event that the open space 64 between the respective flanges of the augers is filled with bulk material thereby prohibiting the relative movement of the augers and the consequent rotation of the control shaft 77, the spring 117 will elongate and put the control linkage under a force which will automatically adjust the metering auger when it is driven.

The control lever 104 is frictionally held in a selected position adjacent an arcuate member 123 having a downwardly projected flange 124. The member 123 is welded to the side of the box-shaped safety shield 39 and contains indicia indicative of the relative position of the metering auger with respect to the first auger. An elongated bar 126 is biased at each end toward the flange 124 by means of compression springs and bolts 127 and functions to clamp and frictionally hold the control lever 104 in a selected angular position.

Although the invention has been described with respect to a preferred embodiment thereof, it is to be understood that it will not be so limited since changes can be made therein which are within the scope of the appended claims.

I claim:

1. A variable volume auger assembly for a bulk material handling vehicle having a box including a pair of longitudinally spaced end walls and a transverse wall dividing the body into forward and aft bulk material holding bins, said end walls and transverse wall having axially aligned openings formed therein adjacent the bottom of said box comprising:

(a) an elongated driven auger assembly passing through said openings and being rotated to move the bulk materials out of the bins, said assembly having first spiral means and second spiral means extending between the forward end wall and transverse wall in the forward bin to vary the volumetric capacity of the portion of the first spiral means in the forward bin to thereby vary the amount of bulk material moved to and mixed with the bulk material in said aft bin, (b) control means connected to said second spiral means for adjusting the volumetric capacity of the auger assembly in the forward bin, and (c) means rotatably mounting the auger assembly on the forward and aft end walls.

2. A bulk material handling vehicle comprising:

(a) a hollow body having a substantially V-shaped cross sectional form, a pair of longitudinally spaced end walls and a transverse wall dividing the body into forward and aft bulk material holding bins, said end walls and transverse wall having axially aligned openings formed therein near the apex thereof adjacent the bottom of said body, (b) an elongated driven auger assembly having a spiral flange means, said assembly passing through said openings and being rotated to move the bulk materials out of the bins and having a spiral means extending between the forward end wall and transverse wall in the forward bin to vary the volumetric capacity of the auger assembly in the forward bin to thereby vary the amount of bulk material moved to and mixed with the bulk material in said aft bin, (c) control means connected to said spiral means for adjusting the volumetric capacity of the auger assembly in the forward bin, (d) means rotatably mounting the auger assembly on the forward and aft end walls, (e) at least one material feeding and agitating means rotatably mounted within and extending longitudinally of said forward bin, said feeding and agitating means being operable to move bulk material toward the forward end wall, (f) means for rotating said auger assembly and feeding and agitating means in opposite directions, and (g) means operatively connected to the aft end wall and drivably connected to the aft end of the auger assembly for moving the bulk material discharged by the auger assembly toward the place where the bulk material is to be deposited.

3. A bulk material handling vehicle comprising:

(a) a hollow body having a pair of longitudinally spaced end walls and a transverse wall dividing the body into forward and aft bulk material holding bins, said end walls and transverse wall having axially aligned openings formed therein adjacent the bottom of said body, (b) an elongated driven auger assembly passing through said openings and being rotated to move the bulk materials out of the bins and having first auger means including a drive shaft, spiral flights secured to the drive shaft, and a spiral ribbon secured to the outer peripheral edge of said spiral flights within the forward bin and projected in a direction substantially parallel to the drive shaft, second auger means concentric with the section of the first auger means in the forward bin and drivably connected to said first auger means, said second auger means having a continuous spiral flange which has a pitch substantially equal to the pitch of the spiral flight of said first auger means, a spiral ribbon secured to the outer peripheral edge of said flange and projecting in a direction substantially parallel to the drive shaft and toward the spiral ribbon on said flights, the diameter of one of said spiral ribbons being larger than the other thereby permitting said ribbons to be moved in telescopic relation, (c) control means connected to said second auger means for adjusting the effective width of the first auger flights and the second auger flanges in the forward bin, and (d) means rotatably mounting the auger assembly on the forward and aft end walls.

4. An auger assembly comprising:
(a) a first elongated means having a spiral flange means,
(b) elongated spiral means movably mounted for axial movement concentric with said first elongated means to vary the volumetric capacity of auger assembly on said first means,
(c) means drivably connecting said first means with said spiral means whereby said first and spiral means rotate as a unit, and
(d) means secured to said spiral means for varying the volumetric capacity of the auger assembly.

5. An auger assembly comprising:
(a) a rotatable shaft having a fixed spiral means of predetermined capacity,
(b) metering spiral means concentric with said fixed spiral means, and adjustably mounted on the shaft for axial movement with respect to said shaft in order to meter the amount of material delivered by said assembly by selectively varying the accessibility of material to the fixed spiral means,
(c) means connecting said metering means for rotation with said shaft.

6. An auger assembly comprising:
(a) a rotatable shaft having a fixed spiral means of predetermined capacity,
(b) metering spiral means concentric and associated with a plurality of turns of said fixed spiral means and mounted on the shaft for axial movement,
(c) means drivably connecting said shaft and metering spiral to rotate the same as a unit, and
(d) means secured to said spiral means for adjustably moving said metering spiral means axially of said shaft to vary the volumetric capacity of the auger means.

7. An auger assembly comprising:
(a) first auger means having a drive shaft, spiral flights secured to the drive shaft, and a first spiral ribbon secured to the outer peripheral edge of said spiral flights and projecting in a direction substantially parallel to the drive shaft, said spiral flights and spiral ribbon having substantially the same pitch,
(b) second auger means concentric with and drivably connected to said first auger means, said second auger means having a continuous spiral flange which has a pitch substantially equal to the pitch of the spiral flights of said first auger means, said flange being disposed in side-by-side relation with said flights and movable along the axis of said first auger, a second spiral ribbon secured to the outer peripheral edge of said flange and projecting in a direction substantially parallel to the drive shaft and toward the first spiral ribbon, the diameter of one of said spiral ribbons being larger than the other thereby permitting said ribbons to be moved in telescopic relation thereby changing the volume between the flights and flange, and
(c) means secured to said second auger means for adjustably moving said second auger means axially of said first auger means.

8. An auger assembly comprising:
(a) first auger means having a drive shaft, spiral flights secured to the drive shaft, and a first spiral ribbon secured to the outer peripheral edge of said spiral flights and projecting in a direction substantially parallel to the drive shaft, said spiral flights and spiral ribbon having substantially the same pitch,
(b) second auger means concentric with and shorter than said first auger means, said second auger means having a continuous spiral flange which has a pitch substantially equal to the pitch of the spiral flights of said first auger means, said flange being disposed in side-by-side relation with said flights and movable along the axis of said first auger, a second spiral ribbon secured to the outer peripheral edge of said flange and projecting in a direction substantially parallel to the drive shaft and toward the first spiral ribbon, the diameter of one of said spiral ribbons being larger than the other thereby permitting said ribbons to be moved in telescopic relation thereby changing the volume between the flights and flange,
(c) means secured to said second auger means for adjustably moving said second auger means axially of said first auger means, and
(d) means drivably connecting said first means with said second means whereby said first and second means rotate as a unit.

9. An auger assembly comprising:
(a) first auger means having a drive shaft, spiral flights secured to the drive shaft, and a first continuous spiral ribbon secured to the outer peripheral edge of said spiral flights and projecting in a direction substantially parallel to the drive shaft, said spiral flights and spiral ribbon having substantially the same pitch, and
(b) second auger means concentric with and drivably connected to said first auger means, said second auger means having a continuous spiral flange which has a pitch substantially equal to the pitch of the spiral flights of said first auger means, said flange being disposed in side-by-side relation with said flights and movable along the axis of said first auger, a second spiral ribbon secured to the outer peripheral edge of said flange and projecting in a direction substantially parallel to the drive shaft and toward the first spiral ribbon on said flights.

10. An auger assembly comprising:
(a) first auger means having a drive shaft, spiral flights secured to the drive shaft, and first means secured to the outer peripheral edge of said spiral flights and projecting in a direction substantially parallel to the drive shaft, said spiral flights and the first means having substantially the same pitch,
(b) second auger means concentric with and drivably connected to said first auger means, said second auger means having a continuous spiral flange which has a pitch substantially equal to the pitch of the spiral flights of said first auger means, said flange being disposed in side-by-side relation with said flights and movable along the axis of said first auger, second means secured to the outer peripheral edge of said flange and projecting in a direction substantially parallel to the drive shaft and toward the first means on said flights, and
(c) means secured to said second auger means for adjustably moving said second auger means axially of said first auger means.

References Cited by the Examiner

UNITED STATES PATENTS

| | | | |
|---|---|---|---|
| 599,392 | 2/98 | Kilby | 259—45 |
| 1,128,043 | 2/15 | Quigley | 110—110 |
| 1,214,753 | 2/17 | Caracristi | 110—110 |
| 2,509,543 | 5/50 | Truax | 259—45 |
| 2,569,039 | 9/51 | Berthelot | 222—282 X |
| 2,576,177 | 11/51 | Herr | 259—6 |
| 2,693,873 | 11/54 | Martin | 198—213 |
| 2,947,524 | 8/60 | Bridges | 259—6 |
| 2,991,870 | 7/61 | Griffith | 259—45 |

RAPHAEL M. LUPO, *Primary Examiner.*

CHARLES A. WILLMUTH, LOUIS J. DEMBO,
*Examiners.*